United States Patent [19] [11] 4,207,218
Jorgensen, Jr. et al. [45] Jun. 10, 1980

[54] FRIABLE RUBBER BALES

[75] Inventors: August H. Jorgensen, Jr., Rocky River; Martin E. Woods, Westlake, both of Ohio

[73] Assignee: The B. F. Goodrich Company, Akron, Ohio

[21] Appl. No.: 890,726

[22] Filed: Mar. 27, 1978

[51] Int. Cl.[2] .......................... C08C 1/07; C08K 3/24; C08K 3/34; C08K 3/36

[52] U.S. Cl. .......................... 260/23.7 M; 260/42.13; 264/117; 525/1; 525/4; 525/5; 525/238; 525/239

[58] Field of Search ............... 260/23.7 M, 42.13, 874; 526/1, 4, 5; 264/117; 525/1, 4, 5, 238, 239

[56] References Cited

U.S. PATENT DOCUMENTS

| | | | |
|---|---|---|---|
| 2,779,974 | 2/1957 | Billing et al. | 53/24 |
| 3,526,688 | 9/1970 | Shelton et al. | 264/123 |
| 3,529,540 | 9/1970 | Ferris | 100/35 |
| 3,687,881 | 8/1972 | Bowman | 526/4 |
| 3,775,933 | 12/1973 | Prescott et al. | 53/24 |
| 3,775,993 | 12/1973 | Murphy | 62/95 |
| 3,803,065 | 4/1974 | Arai et al. | 526/4 |
| 3,923,680 | 12/1975 | Roeder et al. | 264/117 |
| 3,953,389 | 4/1976 | Holliday et al. | 526/5 |
| 3,976,611 | 8/1976 | Aloia | 526/5 |
| 3,989,657 | 11/1976 | Lohr et al. | 260/23.7 M |
| 4,080,358 | 3/1978 | Krumel et al. | 260/874 |
| 4,098,858 | 7/1978 | Ten Broeck | 264/117 |

*Primary Examiner*—Ronald W. Griffin
*Attorney, Agent, or Firm*—Joe A. Powell; J. Hughes Powell, Jr.

[57] ABSTRACT

Particulate rubber is intimately and uniformly coated with an anti-cake(s) and pressed at mild temperatures to form friable rubber bales. The bales have a bulk density from about 1.3 to about two times that of the original particulate rubber and are capable of being handled as a slab and of supporting a direct load, yet break down under shear to form particles substantially similar in size and distribution to that of the original particulate rubber.

16 Claims, No Drawings

FRIABLE RUBBER BALES

BACKGROUND OF THE INVENTION

Rubbers are most often sold in the form of bales which are slabs of solid rubber weighing about 40 to 100 pounds. The slab form is convenient and economical for shipping and storage. However, a large amount of energy is expended in banburys and other internal mixers in masticating the rubbers and mixing them with compounding ingredients prior to forming and vulcanization. Not only is much energy consumed, but special mixing equipment and/or manual or mechanical cutting or grinding operations are often used to reduce the bale to a smaller size. The use of particulate rubber, whether in crumb or powder form, dispenses with the need of high energy mixing equipment and special operations, and saves energy in mixing operations. However, particulate rubber sold in boxes or bags has low bulk density (about 20 to 30 lbs. per cubic foot; about one-third to one-half that of slab rubber). This significantly increases shipping and storage costs.

Furthermore, particulate rubber will coalesce under pressure and form slabs which have to be ground down prior to use. Hence, boxes and bags of particulate rubber must not be stacked one on top of the other unless the rubber is packaged load free; i.e. such that the package takes up the load and not the rubber (See U.S. Pat. No. 3,775,933 for an example of load-free packing of particulate rubber bales).

The use of anti-cake agents to keep rubber slabs from sticking to itself is known. However, such materials have not been examined as agents to coat particulate rubber in such a way as to produce friable rubber bales. The friable bale offers an excellent balance between the economics of shipping and storage and low energy consumption upon use. Hence, it is a highly desirable product in the rubber market.

U.S. Pat. Nos. 2,779,974 and 3,529,540 describe a process for converting particulate cellulose acetate into a block form having a higher bulk density. U.S. Pat. No. 3,775,933 describes a method of producing a friable bale of high ethylene content EPDM elastomer.

SUMMARY OF THE INVENTION

Discrete particles of particulate rubber are uniformly mixed with from about 0.5 parts to about 20 parts by weight of anti-cake agent(s) per 100 parts by weight of rubber, and the mixture molded at a temperature of from about 25° C. to about 100° C. and a pressure of about 20 psig to about 1000 psig for about 10 seconds to about 10 minutes to form a friable rubber bale having a bulk density about 1.3 to about two times that of the original particulate rubber. The friable rubber bales can support a direct load without coalescing, yet readily break down under shear in rubber processing equipment to form particulate rubber of similar size and distribution to that of the original particulate rubber.

DETAILED DESCRIPTION OF THE INVENTION

By the method of the invention, discrete particles of particulate rubber which normally would coalesce upon long standing or under pressure is admixed with anti-cake agent(s) and the mixture compressed to yield a friable bale having a bulk density of about 1.3 to about two times that of the original particulate rubber, and more preferably from about 1.4 times to about 1.7 times that of the original particulate rubber. The friable bale can support a direct load, yet breaks down under shear in rubber processing equipment to form particles of a size and distribution similar to that of the original particulate rubber.

The particle size of the particulate rubber ranges from a powder to crumb size. The preferred range is from about 0.1 millimeter to about 15 millimeters in diameter (from about 0.004 inch to about 0.6 inch in diameter). Any rubber in solid particulate form can be employed. If the rubber is not prepared and/or obtained in a solid particulate form; i.e. if it is in a latex, solution, suspension, or slab, it can be readily put into a particulate form by coagulation, spray drying, grinding or the like.

The term rubber is used in its accepted technical sense as a polymer having in its useful state (usually its vulcanized state but it can be an unvulcanized state as with, for example, thermoplastic rubbers) properties of deformation upon stress and recovery upon release of the stress. A rubber can be further defined as having a glass transition temperature of below 20° C. Most rubbers have a raw polymer Mooney value of from about 20 to about 125 measured at 100° C. (212° F.) after 4 minutes using a large rotor; i.e. a ML-4 reading, and have an elongation at break of from about 100 percent to about 1000 percent or more. Examples of rubbers are natural rubber, polyisoprene rubber, polybutadiene rubber, cis-polybutadiene rubber, polychloroprene rubber, polysulfide rubbers, polypentenamer rubbers, polyacrylated rubbers, poly(butadiene-acrylonitrile) rubbers, poly(isopreneacrylonitrile) rubbers, poly(styrene-butadiene) rubbers, poly(isoprene-styrene rubbers, poly(ethylene-propylene-diene) rubbers, and the like. The term rubber as used in this invention also includes blends of two or more of the elastomers listed above and also blends of at least one elastomer and at least one thermoplastic polymer. An example of a particularly useful blend of an elastomer and a thermoplastic polymer is a blend of butadiene-acrylonitrile rubber and polyvinyl chloride. This blend normally contains from 30 to 50 percent polyvinyl chloride and 50–70 percent butadiene-acrylonitrile rubber. The rubbers may be blended with resins or fillers prior to forming the friable bale.

The particulate rubber is intimately and uniformly admixed with anti-cake agent(s). The agent is used at a level of from about 0.5 to about 20 parts by weight per 100 parts by weight of the particulate rubber. More preferredly, the anti-cake agent is used at a level from about 1 part to about 10 parts by weight. Levels of anti-cake near the higher end of the range are used with low Mooney and/or tacky rubbers, while levels near the lower range are used with high Mooney and/or high hardness rubbers. The prefered level of anti-cake is also influenced by the temperature and pressure used in molding the particulate rubber into a bale. Higher molding temperatures and pressures will necessitate the use of a higher level of anti-cake for a given particulate rubber.

The anti-cake agent must be a solid at ambient temperatures and is preferredly a solid at temperatures up to about 60° C. (about 140° F.). The agent must be substantially nonsoluble in the particulate rubber. This can be easily determined by observing the solubility parameter of both rubber and anti-cake agent and using an anti-cake agent having a solubility parameter at least 1 unit different than that of the rubber.

The anti-cake agent includes three types of materials, (1) inorganic dusting agents, (2) metal salts of organic acids, and (3) hard resins. The inorganic dusting agents include carbon blacks; inorganic clays and silicates such as Kaolin clays (aluminum and hydrated aluminum silicates), talc (magnesium silicate), and the like; silicas; metal oxides such as zinc oxide, magnesium oxide, calcium oxide, lead oxide, and the like; and carbonates such as calcium carbonate and magnesium carbonate. The metal salts of organic acids includes alkali metal, alkaline earth metal, and polyvalent metal salts of carboxylic, organosulfonic, and organophosphoric acids. The more preferred acids are the carboxylic acids. The metal salts of carboxylic acids include group IA metals such as sodium, potassium, and lithium; group IIA metals such as magnesium and calcium; group IIIA metals such as aluminum; group IVA metals such as tin and lead; group IB metals such as copper; group IIB metals such as zinc and cadmium; group VIII metals such as iron, cobalt, and nickel; said metals as salts of aliphatic and aromatic carboxylic acids such as nonanoic acid, decanoic acid, dodecanoic acid, hexadecanoic acid, octadecanoic acid, succinic acid, $\beta$-alkyl succinic acid, adipic acid, azelaic acid, oleic acid, linoleic acid, ricinoleic acid, tartaric acid, benzoic acid, salicyclic acid, phthalic acid, and the like. Examples of the metal salts of carboxylic acids are sodium and lithium dodecanoate, calcium, zinc and magnesium octadecanoate, aluminum hexadecanoate, lead adipate, zinc and cadmium dodecanoate, iron azelate, potassium linoleate, lithium solicilate, aluminum benzoate, lead tartarate, copper and zinc benzoate, and magnesium, zinc, cadmium, iron phthalate, and the like. The hard resins employed have glass transition temperatures of above 40° C., and include homopolymers of vinyl chloride monomer and copolymers of vinyl chloride monomer with copolymerizable monomers such as acrylates, acrylamide, and the like; methacrylate homopolymers and copolymers; polystyrene resins; and poly(styrene/acrylonitrile) resins and the like.

Excellent results have been obtained when the anti-cake agents are inorganic silicates, silicas, and magnesium, calcium, lithium, and zinc salts of aliphatic monofunctional carboxylic acids. The anti-cake agents may be used alone or in combination with each other. Combinations of an inorganic dusting agent and a metal salt of an organic acid have provided excellent results. When used in combination, the total weight of anti-cake used is within the range previously given.

The particulate rubber and anti-cake agent can be admixed using any process or equipment that provides for intimate and uniform mixing. For example, the rubber and agent can be mixed in internal mixers such as Henschel mixers or ribbon blenders. Vibration conveyors can provide the necessary contact between the two ingredients. The particulate rubber can be dip coated or spray coated with solutions, suspensions, or latexes of the anti-cake agent. The mixing can be done during coagulation and wash operations. However, the mixing must be done under low shear conditions as high shear mixing such as in extruder operations will entrap the anti-cake within the particulate rubber where it does not operate to provide protection for the particle.

After the particulate rubber and the anti-cake agent(s) are thoroughly mixed, the mixture is compressed to a friable bale. Baling temperatures range from about 25° C. to about 100° C. and more preferredly from about 40° C. to about 70° C. The temperature varies somewhat with the type of rubber and type of anti-cake agent used. The baling temperature should not greatly exceed the melting point of the anti-cake agent. As to the type of rubber used, low Mooney tacky rubbers should be compressed at temperatures in the lower part of the range. For example, at a pressure of about 600 psig, polyacrylate rubbers, poly(ethyene-propylene) rubbers, and polyisoprene rubber are more effectually compressed at about 40° C.; while poly(styrene-butadiene) rubbers, cis-polybutadiene rubbers, and poly(butadiene-acrylonitrile) rubbers are most effectually compressed at about 50° C.; and high Mooney poly(butadiene-acrylonitrile) rubbers and polychloroprene rubbers are more effectually compressed at about 70° C.

The baling pressure ranges from about 20 psig to 1000 psig and more, while time under compression ranges from about 10 seconds to about 10 minutes. A standard rubber baler can be readily used to compress the particulate rubber and anti-cake agent mixture.

The bale coming out of the compression operation needs no cooling, and can be packaged following standard packaging procedures and using standard equipment. The bales can be dusted between adjacent bales, plastic film can be laid between the bales or separate bagging or boxing of each bale can be used.

The rubber bales prepared by the method of the invention are unique in that they offer an improved balance of space-saving in shipping and storage and friability upon mixing with rubber compounding and cure ingredients. Both the saving of space and friability reduce costs and energy consumption. The rubber bales remain friable even if a direct load is placed upon time. Of course, the loads contemplated are those encountered in ordinary stacking, shipping, and storage conditions.

The friable rubber bale has a bulk density of about 1.3 times to about two times that of the original particulate rubber. Final bulk densities range from about 0.5 gm./cc. to 1.0 gm./cc. (about 30 lbs./ft$^3$ to 60 lbs./ft$^3$). Bales having a density change of greater than about two times that of the original particulate rubber are found to be not friable in the test devised to measure friability.

Friability is measured in a test developed where the compressed bale is subjected to shear mixing for three minutes in a Henschel mixer. The particles coming out of the mixing operation are then passed through screens of successively smaller hole size. The weight percent of particles passing through each screen is then compared to the weight percent that passed through when the original particulate rubber was screened. If less than a 30 percent weight difference existed between the original particles passing through the first two screens and the sheared particles, the bale was held to be friable. Often less than a 10 percent weight difference existed between the original particulate rubber and the particles obtained from the broken down friable bale. The above test for friability is a convenient test which serves as a guideline and can be run quickly but, of course, the ultimate objective is to have friability in the actual production mixing equipment.

The friable rubber bales were also examined for their ease of use in standard mixing and rubber compounding procedures. Savings in energy and time were obtained in comparison with using slab rubber. Furthermore, final vulcanizate properties of compounds made from the friable rubber bales were shown to be similar to those obtained using powder or crumb rubber or slab rubber. Hence, the user of the friable rubber bales does not have to sacrifice rubber properties.

The following examples serve to more fully illustrate the invention. Conditions of temperature, pressure, and time and levels of anti-cake agent(s) within the parameters of the above described invention are shown. Knowing the nature of the rubber and the interrelation of temperature, pressure, and time upon compression, one skilled in the art can readily forsee variations from the actual conditions presented.

EXAMPLES

The process of preparing a friable rubber bale has two aspects; i.e. to ascertain the type and levl of anti-cake agent(s) necessary to coat the particulate rubber to stop it from adhering to itself and coalescing on storage, and to ascertain the baling conditions necessary to obtain a state of compaction such that the bale is cohesive enough to be used like a slab of rubber. The two aspects are related in that the anti-cake agent(s) must prevent coalescense but not preclude a sufficient degree of cohesiveness so that the handling advantages and economics of the bale form are lost.

Low Pressure and Low Temperature Compaction Conditions

EXAMPLE I

A poly(67% butadiene/33% acrylonitrile) rubber having a raw polymer Mooney viscosity of about 80 (ML-4 at 100° C.) was obtained in powder form. The particulate rubber was admixed with a metal salt of a monofunctional carboxylic acid (zinc stearate) as the anti-cake agent at 3 parts by weight of agent per 100 parts by weight of rubber. Mixing was accomplished using a Henschel operating at low shear conditions. The particulate rubber mix was then compacted at various pressures and times at ambient temperatures to yield bales having bulk densities substantially higher than the bulk density of the original particulate rubber. The bales were then subjected to shear mixing in a Henschel mixer for three minutes. The particles obtained were passed through successively smaller hole size screens, and the weight percent of particulate rubber passing through each screen compared to the weight percent distribution of the original particulate rubber. Results obtained are presented in Table 1.

TABLE 1

| | Control | 1 | 2 | 3 | 4 | 5 | 6 |
|---|---|---|---|---|---|---|---|
| Compressed to % of original volume | — | 50 | 50 | 50 | 40 | 40 | 35 |
| Pressure, psig | — | 24 | 24 | 24 | 24 | 24 | 24 |
| Time, minutes | — | 2 | 10 | 30 | 2 | 10 | 2 |
| Bulk density, g./cc. | 0.37 | 0.53 | 0.59 | 0.61 | 0.68 | 0.73 | 0.85 |
| Times increase in bulk density | — | 1.43 | 1.59 | 1.65 | 1.84 | 1.97 | 2.30 |
| Firm bale | — | yes | yes | yes | yes | yes | yes |
| Particle size distribution Weight % through screen | | | | | | | |
| 2000μ | 88 | 92 | 90 | 88 | 77 | 85 | none |
| 1000μ | 71 | 75 | 74 | 71 | 56 | 67 | none |
| 500μ | 52 | 56 | 53 | 49 | 29 | 42 | none |
| 250μ | 19 | 21 | 15 | 12 | 5 | 7 | none |
| 125μ | 3 | 3 | 2 | 2 | 1 | 1 | none |

The data shows that under a variety of compaction conditions a firm bale having a bulk density at least 1.4 times that of the particulate rubber can be prepared. At a level of compaction above about 1.3 times the bale can be handled as a slab, resulting in ease of handling and economics in shipping and storage. However, note that with increasing compaction the ability of the prepared bale to break down under shear mixing to yield a particle distribution similar to that of the original rubber decreases. And when compaction reaches a point where the bale has over two times the bulk density of the original particulate rubber, the bale ceases to be friable. The exact point at which compaction goes too far so as to yield a nonfriable bale depends upon the type and level of anti-cake used and the type of rubber being compacted. However, the range for all rubbers evaluated is from about 1.3 times to two times the original bulk density. Below about 1.3 times the bale does not have sufficient cohesive strength to be handled as a slab. Above two times the bale is deemed nonfriable. A more preferred level of compaction is from about 1.4 times to about 1.7 times the original bulk density of the particulate rubber.

EXAMPLE II

The preceding example was repeated using a similar poly(butadiene/acrylonitrile) rubber having a Mooney viscosity of about 50. The lower Mooney rubber, when subjected to compression, reaches a maximum compaction point in terms of bulk density at a lower level than does a higher Mooney rubber. Again, the particulate rubber was admixed with 3 parts by weight of zinc stearate per 100 parts of rubber. Results are as shown in Table 2.

TABLE 2

| | Control | 1 | 2 | 3 | 4 | 5 | 6 |
|---|---|---|---|---|---|---|---|
| Compressed to % of original volume | — | 55 | 55 | 50 | 50 | 45 | 42 |
| Pressure, psig | — | 24 | 24 | 24 | 24 | 24 | 24 |
| Time, minutes | — | 2 | 10 | 2 | 10 | 2 | 2 |
| Bulk density, g./cc. | 0.45 | 0.63 | 0.66 | 0.66 | 0.71 | 0.74 | 0.85 |
| Times increase | — | 1.40 | 1.46 | 1.46 | 1.58 | 1.64 | 1.89 |
| Firm bale | — | yes | yes | yes | yes | yes | yes |
| Particle size distribution Weight % through screen | | | | | | | |
| 2000μ | 100 | 97 | 97 | 93 | 90 | 74 | none |
| 1000μ | 98 | 89 | 89 | 80 | 74 | 49 | none |
| 500μ | 78 | 54 | 53 | 42 | 38 | 22 | none |
| 250μ | 18 | 7 | 8 | 8 | 6 | 3 | none |
| 125μ | 3 | 1 | 1 | 1 | 1 | 0 | none |

The particle distribution after shear mixing shows that a compaction level of about 1.6 times is attainable with the rubber and type and level of anti-cake agent used. Sample 5 is adjudged to be nonfriable on the basis of our test requirements of friability (i.e. on the weight percent of particulate rubber passing through the second, 1000μ, screen must be within thirty percent of the weight percent of the original particulate rubber). Sample 6 is nonfriable at a compaction level of 1.9 times original bulk density.

EXAMPLE III

The powder rubbers used in Examples I and II and the friable rubber bales prepared as Sample 1, Example I, and Sample 4, Example II, were mixd with vulcanizing and rubber compounding ingredients and cured. A slab rubber form of the powder rubbers was also used (as a control). Following standard procedures, the complete mixing cycle for the powder rubber and friable rubber bale of Example I (this includes both Banbury and mill mix time) was 4 minutes compared to 9 minutes when the slab form was used. The complete mixing cycle for the powder rubber and friable rubber bale of Example II was also 4 minutes, while the mixing time of the slab form was 9.5 minutes. The use of a powder form or friable rubber bale form of rubber results in significantly less mixing time and less energy expended.

The cure recipe used to vulcanize the rubbers is shown in Table 3 (in parts by weight):

Table 3

| | |
|---|---|
| Rubber | 100 |
| N550 Black | 65 |
| Di(2ethylhexyl)phthalate | 15 |
| Zinc Oxide | 5 |
| Stearic Acid | 1 |
| Tetramethylthiuram disulfide | 1.5 |
| 4,4'dithiodimorpholine | 1.5 |

Each of the rubbers and their forms were cured and stress strain data obtained following ASTM D412 and hardness following ASTM D676—durometer A. Cure conditions were 10 minutes at 338° F. (as determined using a Monsanto Rheometer).

The cure data obtained, which is shown in Table 4, demonstrates that equal vulcanizate properties can be obtained no matter which form of the rubber is used. The anti-cake agents do not interfere with cure.

TABLE 4

| | Example I Rubber | | | Example II Rubber | | |
|---|---|---|---|---|---|---|
| | Powder | Bale | Slab | Powder | Bale | Slab |
| 100% modulus psi | 780 | 770 | 650 | 600 | 660 | 670 |
| Tensile, psi | 2610 | 2670 | 2580 | 2570 | 2700 | 2730 |
| Elongation, percent | 300 | 300 | 300 | 380 | 390 | 370 |
| Hardness, Durometer A | 73 | 73 | 70 | 70 | 71 | 70 |

High Pressure and/or High Temperature Compaction Conditions

The baling conditions in Examples I and II were low temperature; i.e. ambient temperature (about 25° C.), low pressure; i.e. at about 20 psig, and long times; i.e. two to ten minutes. In most production operations, baling conditions will be at high pressures; i.e. above 100 psig, at high temperatures; i.e. above 50° C., and at short times; i.e. from about 15 to 45 seconds. Although pressure, temperature, and time are all interrelated in a manner known to the skilled artisan, results at operating conditions more similating production operations have shown that at higher temperatures and pressures during compaction, levels of anti-cake agent(s) at the high end of the defined range are needed to achieve a friable bale at 1.3 times to two times compaction. The need for higher levels of anti-cake agent at high temperature and pressure compaction conditions is understandable from the nature of rubber to get more tacky and to flow more under these conditions.

EXAMPLE IV

A poly(67% butadiene/33% acrylonitrile) rubber having a raw polymer Mooney of about 80 (ML-4 at 100° C.) was admixed with various levels of anti-cake agent. A combination of a metal salt of a carboxylic acid and an inorganic silicate was used. The agents were admixed with the particulate rubber (which was in powder form). The bales obtained were evaluated in the shear mix test and adjudged to be friable or not. The results are shown in Table 5.

TABLE 5

| | 1 | 2 | 3 | 4 | 5 | 6 | 7 | 8 |
|---|---|---|---|---|---|---|---|---|
| Rubber | 100 | 100 | 100 | 100 | 100 | 100 | 100 | 100 |
| Zinc Stearate | 3 | 3 | 3 | 3 | 3 | 3 | 3 | 3 |
| Magnesium silicate | — | 2 | 2 | 5 | 2 | 5 | 2 | 5 |
| Conditions | | | | | | | | |
| Pressure, psig | 120 | 120 | 600 | 600 | 120 | 120 | 600 | 600 |
| Temperature, °F. | 72 | 72 | 72 | 72 | 130 | 130 | 130 | 130 |
| Time, seconds | 30 | 30 | 30 | 30 | 30 | 30 | 30 | 30 |
| Bulk density, g./cc. | 0.75 | 0.60 | 0.75 | 0.68 | 0.85 | 0.75 | 0.86 | 0.79 |
| Times increase[a] | 1.50 | 1.20 | 1.50 | 1.36 | 1.70 | 1.50 | 1.72 | 1.58 |
| Friable bale | No | Yes | Yes | Yes | Yes | Yes | No | Yes |

[a]original bulk density of particulate rubber is about 0.50 g./cc.

The data in Table 5 shows that a level of 3 parts by weight of zinc stearate which was satisfactory to provide a friable bale at low temperatures and pressure (Example I) does not provide a friable bale when higher pressures are used for compaction (see Sample 1). However, when two parts by weight of another anti-cake agent was added, a friable bale was obtained (see Sample 3 v. Sample 1). The same combination of 5 parts total of anti-cake agent was successful in providing a friable bale when the pressure remained the same but compaction temperature was higher (see Sample 5 v. Sample 1). When compaction temperature and pressure rose, 8 parts total of anti-cake agent were required to provide a friable bale (Sample 8 v. Sample 1).

EXAMPLE V

In Example IV a high Mooney particulate rubber was used. If a lower Mooney version of the same rubber is used, a higher bulk density bale is prepared under the same operating conditions. Knowing this, a higher level of anti-cake may be needed to obtain a friable rubber bale. The following example illustrates this. Two Mooney viscosity poly(67% butadiene/33% acrylonitrile) rubbers were used as shown in Table 6.

TABLE 6

| | | | | |
|---|---|---|---|---|
| 80 Mooney Rubber[a] | 100 | — | 100 | — |
| 30 Mooney Rubber[b] | — | 100 | — | 100 |
| Zinc Stearate | 3 | 3 | 3 | 3 |
| Magnesium Silicate | 2 | 2 | 2 | 2 |
| Conditions | | | | |
| Temperature, °F. | 72 | 72 | 72 | 72 |
| Pressure, psig | 120 | 120 | 600 | 600 |
| Bulk Density, g./cc | 0.60 | 0.75 | 0.75 | 0.85 |
| Times Increase | 1.20 | 1.67 | 1.50 | 1.89 |
| Friable Bale | Yes | Yes | Yes | No |

[a]Original bulk density of 0.50 g./cc
[b]Original bulk density of 0.45 g./cc

In Samples 1 and 2, the lower Mooney rubber underwent a greater degree of compaction under the operating conditions. However, the compaction was not beyond about 1.8 times, a seemingly critical limit. In Samples 3 and 4, the lower Mooney rubber was compacted too much under the conditions to form a friable bale. However, as seen in Example IV, the use of higher levels of anti-cake agent will yield a friable bale at these compaction conditions.

EXAMPLE VI

A poly(67% butadiene/33% acrylonitrile) rubber having a raw polymer Mooney viscosity of about 80 (ML-4 at 100° C.) was admixed with various levels of zinc stearate and magnesium silicate as the anti-cake agents, and the mix compacted at various conditions of temperature and time (all at 600 psig pressure) to form six pound bales. The particulate rubber averages about 0.25 inches (6 cm) in diameter. The rubber and anti-cake agents were mixed two minutes at ambient temperatures using a ribbon blender. The mix was preheated in an oven to the temperature at which it was to be compacted. Under the compaction conditions encountered, the bales obtained were friable and had a bulk density increase of from between 1.4 times and 1.8 times that of the original particulate rubber. The recipes and results are shown in Table 7.

TABLE 7

| | 1 | 2 | 3 | 4 | 5 | 6 | 7 | 8 |
|---|---|---|---|---|---|---|---|---|
| Rubber[a] | 100 | 100 | 100 | 100 | 100 | 100 | 100 | 100 |
| Zinc Stearate | 1 | 1 | 1 | 1 | 1 | 1 | 0.5 | — |
| Magnesium silicate | 2 | 2 | 2 | 2 | 2 | 2 | 2.5 | 3 |
| Conditions (at 600 psig) | | | | | | | | |
| Temperature, °F. | 120 | 140 | 160 | 180 | 140 | 140 | 160 | 160 |
| Time, seconds | 25 | 25 | 25 | 25 | 15 | 40 | 25 | 25 |
| Bulk density, g./cc. | 0.62 | 0.64 | 0.72 | 0.79 | 0.65 | 0.70 | 0.69 | 0.65 |
| Times increase | 1.41 | 1.45 | 1.63 | 1.79 | 1.47 | 1.59 | 1.57 | 1.47 |
| Friable bale | Yes | Yes | Yes | Yes | Yes | Yes | Yes | Yes |

[a]original bulk density of about 0.44 g./cc.

EXAMPLE VII

The testing procedure of Example VI was repeated. The level and type of anti-cake agent and compaction pressure and time were held constant and the type and Mooney viscosity of the particulate rubber and compaction temperature varied. The rubbers used are identified in Table 8.

TABLE 8

| Rubber | Weight % Butadiene | Weight % Acrylonitrile | Mooney Viscosity (ML-4 at 100° C.) |
|---|---|---|---|
| A | 77 | 23 | 80 |
| B | 71 | 29 | 80 |
| C | 67 | 33 | 80 |
| D | 59 | 41 | 80 |
| E | 59 | 41 | 50 |
| F | 67 | 33 | 30 |

The rubbers were each admixed with 1 part by weight of zinc stearate and 2 parts by weight of magnesium silicate per 100 parts by weight of rubber, following the mixing procedure of Example VI. Results are given in Table 9.

TABLE 9

| Rubber Mix[a] | A-1 | A-2 | A-3 | B | C | D | E | F-1 | F-2 |
|---|---|---|---|---|---|---|---|---|---|
| Conditions (pressure at 600 psig) time at 25 seconds) | | | | | | | | | |
| Temperature, °F. | 120 | 160 | 180 | 140 | 140 | 140 | 140 | 120 | 160 |
| Bulk density, g./cc. | 0.61 | 0.67 | 0.73 | 0.66 | 0.67 | 0.67 | 0.76 | 0.85 | 0.99 |
| Times increase | 1.56 | 1.72 | 1.87 | 1.47 | 1.56 | 1.52 | 1.58 | 1.70 | 1.98 |
| Friable bale | Yes | Yes | Yes | Yes | Yes | Yes | Yes | Yes | NO |

[a]original bulk density of rubber mixes:
A-1, A-2, A-3 at 0.39 g./cc.
B at 0.45 g./cc.
C at 0.43 g./cc.
D at 0.44 g./cc.
E at 0.48 g./cc.
F-1, F-2 at 0.50 g./cc.

The rubber bales were adjudged friable except for sample mix F-2. This sample has a low Mooney rubber and would form a friable rubber bale at lower temperatures (Sample F-1) and/or at lower pressures (see Example V) and higher anti-cake levels (See Example IV).

The friable rubber bales of this invention have many uses. They can be mixed with fillers, vulcanizing agents, and other compounding ingredients to produce rubber compounds suitable for use in many products such as belting, hose, tires, molded goods and the like.

We claim:

1. A friable bale of rubber comprising discrete particles of particulate rubber wherein a majority of the discrete rubber particles have therebetween a layer of at least one anti-cake material selected from the group consisting of inorganic dusting agents, metal salts of organic acids, and hard resins having a glass transition temperature above 40° C.; wherein said anti-cake is used at a level of from about 0.5 to about 20 parts by weight per 100 parts by weight of said particulate rubber; and wherein the bulk density of said friable bale is from about 1.3 to about two times the bulk density of the particulate rubber; and said increase in bulk density is achieved by molding the particulate rubber into a bale at a pressure of from about 20 psig to about 1000 psig and at a temperature of from about 25° C. to about 100° C. and a time under compression of from about 10 seconds to about 10 minutes.

2. A friable bale of claim 1 wherein the diameter of the discrete particles of particulate rubber is from about 0.1 millimeter to about 15 millimeters.

3. A friable bale of claim 2 wherein the particulate rubber is molded at a temperature of from about 40° C. to about 70° C.

4. A friable bale of claim 2 wherein the anti-cake is used at a level of from about 1 to about 10 parts by weight per 100 parts by weight of particulate rubber.

5. A friable bale of claim 2 wherein the bulk density of said bale is from about 1.4 to about 1.7 times the bulk density of the particulate rubber.

6. A friable bale of claim 4 wherein the anti-cake is at least one material selected from the group consisting of inorganic silicates, silicas, and metal salts of aliphatic monofunctional carboxylic acids.

7. A friable bale of claim 6 wherein the anti-cake is zinc stearate.

8. A friable bale of claim 6 wherein the anti-cake is a mixture of zinc stearate and magnesium, silicate.

9. A friable bale of claim 6 wherein the anti-cake is magnesium silicate.

10. A friable bale of claim 6 wherein the rubber is poly(butadiene-acrylonitrile).

11. A friable bale of claim 1 wherein the rubber is a blend of from about 50 to about 70 percent by weight of butadiene-acrylonitrile rubber and from about 30 to about 50 percent by weight of polyvinyl chloride.

12. A method of producing a friable bale of rubber comprising (a) coating discrete particles of particulate rubber with a layer of at least one anti-cake material selected from the group consisting of inorganic dusting agents, metal salts of organic acids, and hard resins having a glass transition temperature above 40° C.; wherein said anti-cake is used at a level of from about 0.5 to about 20 parts by weight per 100 parts by weight of said particulate rubber; (b) compressing said particulate rubber to a bulk density of from about 1.3 to about two times the bulk density of the uncompressed particulate rubber, said compressing being conducted at a pressure of from about 20 psig to about 1000 psig and at a temperature of from about 25° C. to about 100° C. and for a time of from about 10 seconds to about 10 minutes.

13. A method of claim 12 wherein the diameter of the discrete particles of particulate rubber is from about 0.1 millimeter to about 15 millimeters.

14. A method of claim 13 wherein the particulate rubber is compressed to a bulk density of from about 1.4 to about 1.7 times the bulk density of the uncompressed particulate rubber.

15. A method of claim 13 wherein the anti-cake is at least one material selected from the group consisting of inorganic silicates, silicas, and metal salts of aliphatic monofunctional carboxylic acids.

16. A method of claim 15 wherein the particulate rubber is poly(butadiene-acrylonitrile).

* * * * *